(12) United States Patent
Fox

(10) Patent No.: US 6,799,873 B2
(45) Date of Patent: Oct. 5, 2004

(54) MULTIFUNCTIONAL THIRD BRAKE LIGHT

(76) Inventor: Ronald M. Fox, 605 Prairie La., Altamonte Springs, FL (US) 32714

( * ) Notice: Subject to any disclaimer, the term of this patent is extended or adjusted under 35 U.S.C. 154(b) by 0 days.

(21) Appl. No.: 10/225,271

(22) Filed: Oct. 8, 2002

(65) Prior Publication Data

US 2003/0039126 A1 Feb. 27, 2003

(51) Int. Cl.[7] ............................................. F21W 101/14
(52) U.S. Cl. ....................................... 362/485; 362/541
(58) Field of Search ................................ 362/485, 541, 362/540, 543, 544

(56) References Cited

U.S. PATENT DOCUMENTS

| | | | | |
|---|---|---|---|---|
| 4,839,629 A | * | 6/1989 | Brown | 340/468 |
| 4,896,136 A | * | 1/1990 | Hotovy | 340/468 |
| 5,126,926 A | * | 6/1992 | Chiang Wen | 362/541 |
| 5,144,538 A | * | 9/1992 | Harris | 362/485 |
| 5,393,115 A | * | 2/1995 | Hamilton | 296/52 |
| 5,550,718 A | | 8/1996 | Shy | 362/80.1 |
| 5,648,756 A | | 7/1997 | Zadok | 340/468 |
| 6,260,990 B1 | | 7/2001 | Saunders | 362/485 |

* cited by examiner

Primary Examiner—Laura K. Tso
(74) Attorney, Agent, or Firm—Terry M. Sanks, Esquire; Beusse Brownlee Wolter; Mora & Maire, P.A.

(57) ABSTRACT

A third brake light apparatus for a truck, the apparatus comprising an attachment comprising a front side, a top side and a back side wherein the attachment fits over an upper edge of a tailgate, a reflector cover comprising a top surface connected to the top side of the attachment, a light within the reflector cover, and a wire assembly connected to the light at a first end and comprising a connector at a second end for connecting the cord to a brake light system in the truck.

17 Claims, 2 Drawing Sheets

MULTIFUNCTIONAL THIRD BRAKE LIGHT

BACKGROUND OF THE INVENTION

This invention relates to an exterior light for a vehicle, and more particularly, to a third brake light for a vehicle with a tailgate.

Until recently, all vehicles were equipped with two brake lights, one on the left and the other on the right rear end of the vehicle. As an improvement to vehicular safety, third brake lights began being added to vehicles recently. For automobiles, these lights were added either behind the rear windshield or imbedded in the tail of the car between the first two brake lights. For older model cars, third brake light systems, such as disclosed in U.S. Pat. No. 5,550,718, were made available to consumers to install within these older automobiles.

With respect to trucks, a third brake light is typically pre-installed behind the rear windshield and, in some situations, the third brake light is located within a side surface of the tailgate facing towards traffic behind the truck. For older truck models, a third brake light can be installed behind the rear windshield.

As the number of trucks on the road today increases, along with the number of vehicles overall, the possibility of accidents also increase. More consumers are selecting trucks or quad-cab units today than ever before, where the trucks perform double duty as family vehicles and all-purpose haulers.

With respect to hauling, depending on the size of a load to be hauled, the presently available third brake lights may not be visible because of the load. For example, with respect to a brake light installed behind the rear windshield, a load may be high enough to block the rear windshield, thus also blocking the third brake light. Similarly, a load may require a rear tailgate to be in a lowered or open position wherein a third brake light installed on the side surface of the tailgate would not be visible to a driver behind the truck, since the light would now shine towards the ground instead of at a vehicle behind the truck. Likewise, if a truck is equipped with both a rear windshield and tailgate third light, hence four brake lights, only the traditional two would be visible if the load is big enough to obstruct both the third, or rear windshield, and fourth, or tailgate, lights. In these instances, the safety realized with the third brake light is lost. Thus, consumers would benefit from a third brake light system, which still provides a third brake light when a truck is hauling a big load.

As is typically the case, the third brake light on a truck is installed behind the rear windshield, not at the same depth perception as the other two brake lights. If a driver traveling in a vehicle behind the truck concentrates on the third brake light and thus assume a wrong depth perception with respect to an end of the truck, an accident may occur. The added feature of having a third brake light at the same depth perception as the first two brake lights is lost when located behind the rear windshield.

BRIEF DESCRIPTION OF THE INVENTION

This invention is directed to an apparatus, improvement, system, and method for providing a third brake light to a truck. Accordingly, an apparatus comprises an attachment comprising a front side, a top side and a back side wherein the attachment fits over an upper edge of a tailgate. A reflector cover comprising a top surface is connected to the top side of the attachment. A light is located within the reflector cover. A wire assembly is connected to the light at a first end and also comprises a connector at a second end for connecting the cord to a brake light system in the truck.

An improvement to a tailgate on a vehicle is also disclosed. The improvement has a brake light attached to the tailgate wherein the brake light is selectively positioned on either an upper edge of the tailgate or a side surface of the tailgate.

In another preferred embodiment, a third brake light system is disclosed. A first brake light is connected to an upper edge of a tailgate of the truck. A second brake light is connected to a side surface of the tailgate. A switch to activate either the first brake light or the second brake light based on a position of the tailgate is also provided.

In another preferred embodiment, a method for providing a third brake light on a truck is disclosed. The method comprises providing a tailgate on a truck that is operable to be positioned in a closed and an opened position. The method also provides for a brake light attached to the tailgate. The brake light is selectively positioned to illuminate towards traffic behind the truck, dependent on a position of the tailgate.

BRIEF DESCRIPTION OF THE DRAWINGS

The invention itself, both as to organization and method of operation, may best be understood by reference to the following description in conjunction with the accompanying drawings for which like numbers represent like parts throughout the drawings and in which.

DETAILED DESCRIPTION OF THE INVENTION

With reference to the figures, exemplary embodiments of the invention will now be described. The scope of the invention disclosed is applicable to a plurality of third brake lights. Thus, even though embodiments are described specific to trucks, this invention is also applicable to other vehicles, especially those with tailgates. Thus the term truck, is interchangeable with the term vehicle. Likewise, as one skilled in the art will recognize, the present invention may be used for attaching other devices to tailgates, such as illuminated signs.

Figure 1:
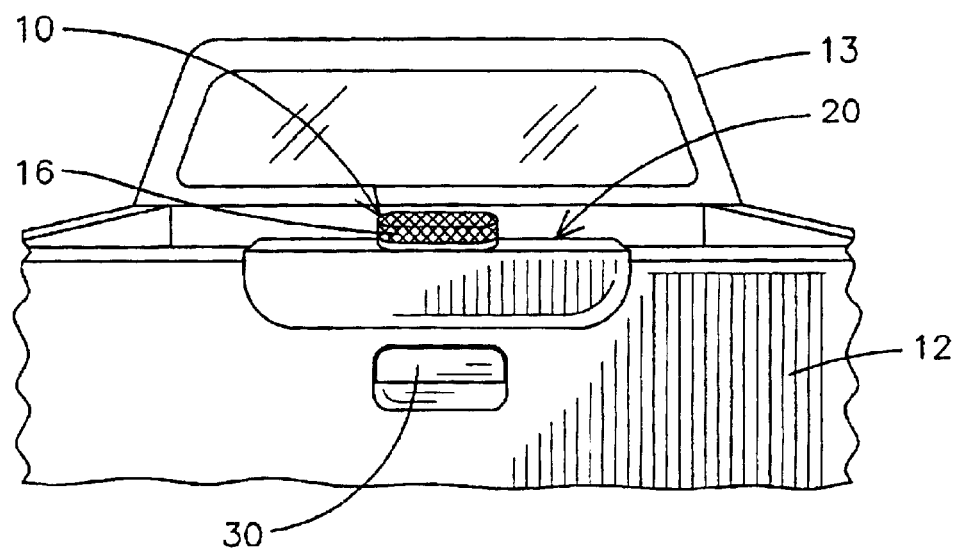
FIG. 1 is an exemplary embodiment of one preferred embodiment of the present invention attached to a tailgate in a closed position.
Figure 2:
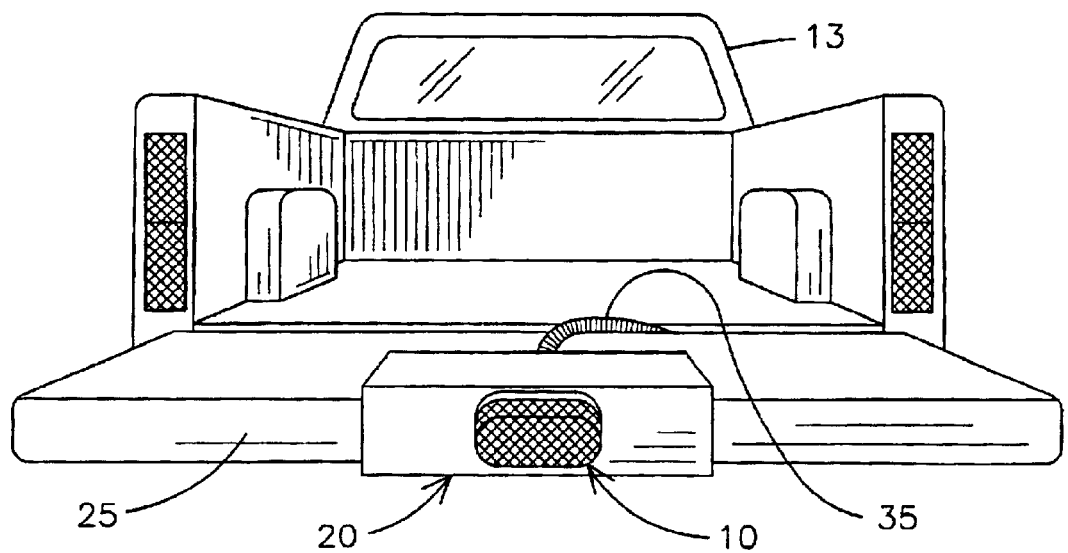
FIG. 2 is an exemplary embodiment of one preferred embodiment of the present invention attached to a tailgate in an open position.

FIGS. 1 and 2 illustrate exemplary embodiments of one preferred embodiment of the present invention attached to a tailgate of a truck. As illustrated, a brake light 10, which is part of the present invention, is viewable by an individual behind the truck when a tailgate 12 on the truck 13 is either in a closed, or up position, and in an open, or down, position. As illustrated, in one preferred embodiment, the light 10 is raised a distance above an upper edge of the tailgate 12 so that a side reflector surface 16 of the brake light is visible when the tailgate is in a closed position.

Figure 3:
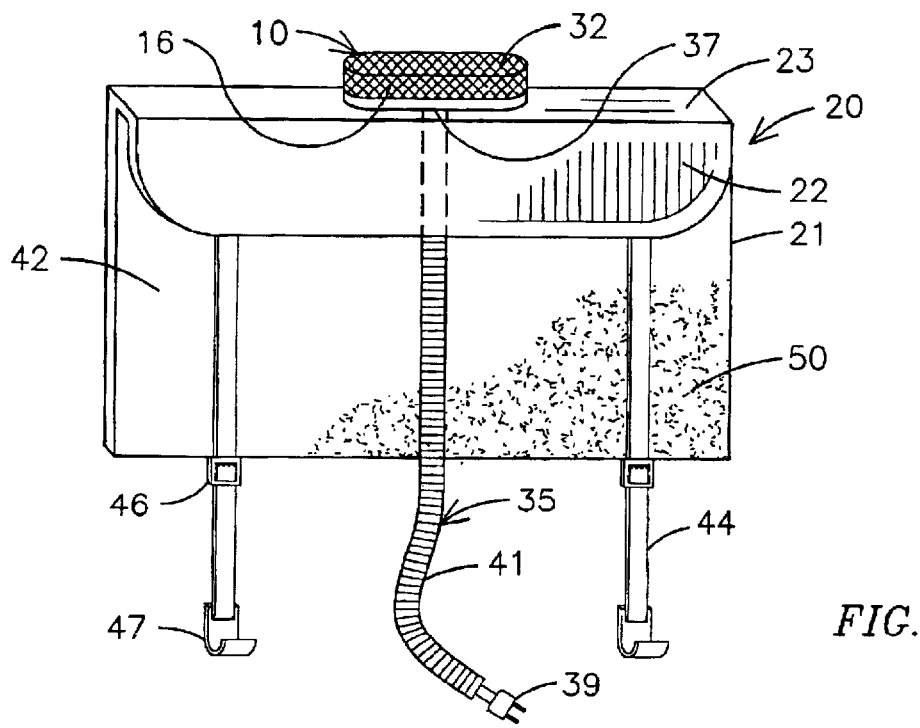
FIG. 3 is an exemplary embodiment of one preferred embodiment of the present invention.

As is illustrated in FIGS. 1 through 3, an exemplary embodiment of the present invention comprises an attachment 20 having two legs, or a back side and a front side, 21, 22 and a top segment, or side, 23 that separates the two legs 21, 22. In one preferred embodiment, a first leg 21 of the attachment is longer than a second leg 22. When placed over the upper edge of a tailgate 25, the longer leg 21 extends downward into the bed of the truck, whereas the second leg 22 extends downward outside of the tailgate 12 so as not to interfere with a latch 30 used to open the tailgate 12. The top segment 23 is positioned over the upper edge, top edge or lip 25, of the tailgate. On a top surface of the top segment 23, a brake light 10 is attached to the top segment 23. The brake light 10 is elevated above the top segment 23. The light 10 is visible on a top reflector surface 32 and a side reflector surface 16 that faces beyond the back of the truck, or towards traffic behind the truck 13. Thus when illuminated, both the top reflector surface 32 and the side reflector surface 16 that faces beyond the back of the truck 13 are illuminated.

In another preferred embodiment of the invention (not shown), the light is attached to the second leg 22, where the top reflector surface 32 faces towards traffic behind the vehicle when the tailgate 12 is in a closed position. When the tailgate 12 is in an opened position, the side reflector surface 16 is visible by traffic behind the vehicle.

In one preferred embodiment (not shown), the brake light 10 is operable to be selectively moved from the top segment 23 of the attachment 20 to the second leg 22 of the attachment 20. Thus, if a load is placed in the truck bed, such as a load of lumber, in which the tailgate 12 is not lowered but the load instead rests on the upper edge 25 of the tailgate 12, the light 10 may be rotated, or positioned, onto the second leg 22 to avoid the light or lens from being damaged by the load. In another preferred embodiment, the brake light 10 is operable to be selectively moved to the first leg 21, thus when the tailgate 12 is down, it is placed on the first leg 21 instead of the upper edge 25 of the tailgate 12.

In another preferred embodiment where the brake light 10 is operable to be selectively moved from the top segment 23 of the attachment 20 to the second leg 22 of the attachment 20, the brake light 10 is not raised, or elevated above the tailgate 12, but is instead imbedded into the attachment 20 where the top reflector surface 32 is visible when illuminated. When the tailgate 12 is closed, the brake light 10 is positioned onto the second leg 22 of the attachment 20 and when the tailgate 12 is in an open position, the brake light 10 is positioned onto the top segment 23 of the attachment 20 and thus on the upper edge 25 of the tailgate 12.

A preferred embodiment of the present invention has a wire assembly or harness 35, as illustrated in FIGS. 2 and 3. A first end of the wire assembly 37 connects to the light. A second end 39 has a connection that is operable to connect into the truck's brake light system, generally the one existing for the other two brake lights. An exemplary connection 39 to the truck's brake light system is with a trailer hitch plug 39, which connects to a trailer hitch wiring harness. An outer surface of the wire assembly 41 is encased in a flex tubing to protect or shield the wire assembly 35 from damage while also making it easily to positioned the wire assembly to best connect with the truck's brake light system. In a preferred embodiment, a length of the outer surface of the wire assembly 35 connects to an inner surface 42 of the first leg 21, in order to control where the wire assembly 35 is positioned.

As further illustrated in FIGS. 2 and 3, the attachment is secured, or held in place on the tailgate. In one preferred embodiment, cinch/tension straps 44 are used to secure the attachment 20. The straps 44, in conjunction with buckle 46 and hook assemblies 47, allow for speedy connection of the attachment 20 to the tailgate 12. In a preferred embodiment, the hook assembly 47 allows the product to be held in place by placing two hooks on the bottom lip, or lower edge, of the tailgate 12, which may be coated with rubber to protect the paint of the truck 13. One skilled in the art will recognize that a plurality of other securing devices may be used to hold present invention in place including, but not limited to, bungee cords, and forming the attachment so that it has a tight, or snug, connection to the tailgate 12 so as not to need additional securing devices.

As illustrated in FIG. 3, a soft surface is applied to an inner surface of the attachment. Exemplary examples of the soft surface 50 include, but are not limited to, adhesive-backed closed-cell foam, such as used for weather stripping, thus allowing for a snug fit on a plurality of truck tailgates having varied thickness, while also protecting the truck's paint from being damaged by the attachment 20. As illustrated, the soft surface 50 is placed on the inner surface 42 of the first leg 21 and the inner surface of the top segment, and though not illustrated, may also be placed on the inner surface of the second leg.

The attachment 20 can be inexpensively manufactured from vacu-form or heat-press molds. The light 10 can be a clearance light where it is inexpensively connected to the attachment 20, such as riveted in place. Similarly, rivets may be used to fasten the buckle end 46 of the straps 44 to the attachment 20. As one skilled in the art will immediately recognize, a plurality of other ways exist, such as but not limited to glue, to connect the elements of the present invention together. Likewise, with respect to connecting the brake light 10 to the attachment 20 where the brake light 10 may be positioned on either the top segment 23 or either leg 21, 22, a plurality of connectors may be used, such as, but not limited to, a sliding clip that locks the brake light 10 in place when reaching a desired position.

In another preferred embodiment of the present invention, the invention can be fixed over the edge of a truck bed extender. Similarly, because of its design, if lumber or another load is carried in which the attachment may fit on, the present invention may be placed at the end of such a load such as over an end of a load of lumber, thus providing additional depth perception as to an end of the load.

Figure 4:
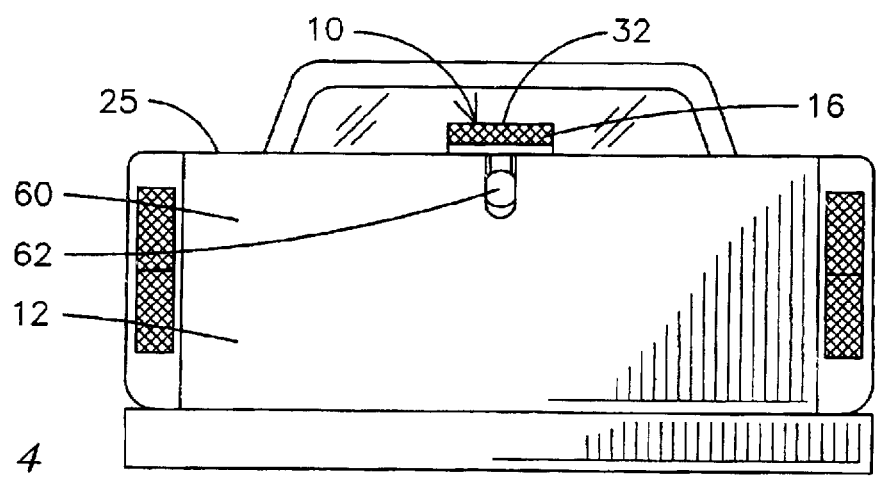
FIG. 4 is an exemplary embodiment of another preferred embodiment of the present invention integrated into a tailgate.

In another preferred embodiment, illustrated in FIG. 4, an attachment is not provided and the light 10 is built into the upper edge 25 of the tailgate 12 where the light 10 is elevated from the surface of the tailgate 12 where the top reflector surface 32 and the side reflector surface 16 are visible depending upon a direction from which the brake light 10 is viewed. In a preferred embodiment, for reasons discussed above, the light 10 is pivotal where it can be placed either on the upper edge 25 of the tailgate 12 or on the outer side of the tailgate 60. In one preferred embodiment, a ball joint connection 62 is used to allow the light 10 to be selectively positioned in either location where a cover (not shown) automatically slides into place over the hole that the light 10 is not occupying. Those skilled in the art will recognize that other selectively moveable connections may be used to move the light 10 between the two locations.

In another preferred embodiment (not shown) where the brake light 10 is operable to be selectively positioned on either the upper edge 25 of the tailgate 12 or on the side 60 of the tailgate 12 facing towards traffic behind the truck 13, instead of a brake light 10 elevated above the tailgate 12 with the top reflector and side reflector surfaces 32, 16 visible, only a top reflector surface 32 is visible. The brake light 10 is imbedded into the tailgate 12 at a given depth, where the brake light 10 may be flush with the tailgate 12 or rise slightly above the tailgate 12. In operation, the brake light 10 is positioned on the side 60 of the tailgate 12 when the tailgate 12 is in an up, or closed position. Similarly, the brake light 10 is positioned on the upper edge 25 of the tailgate 12 when the tailgate 12 is in a down, or opened position. The brake light 10 may either be manually moved between these two locations or automatically positioned either automatically based on a position of the tailgate 12, as discussed below, or manually by a user activating a switch 66.

Figure 5:
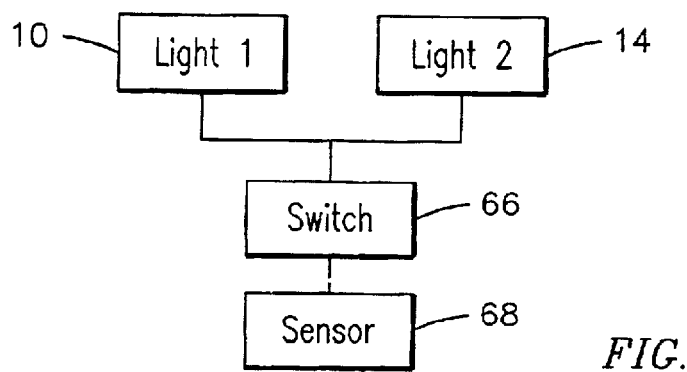
FIG. 5 is an exemplary embodiment of a block diagram illustrating a sensor and switch used when two versions of a third brake light are used.

In another preferred embodiment (not shown), two brake lights 10, 14 are imbedded in the tailgate 12. A first light 10 is imbedded in the upper edge 25 of the tailgate 12 and a second light 14 is imbedded in the side 60 of the tailgate 12 facing towards traffic behind the truck 13. As illustrated in FIG. 5, a sensor 68, is provided to select which third brake light 10, 14 is operable, based on a position of the tailgate 12. Thus if the tailgate 12 is closed, the sensor 68 will command the switch 66 to activate the light 10 that illuminates towards traffic behind the truck 13. If the tailgate 12 is opened, the light 10 on the upper edge 25 is activated. The switch 66 is either manually selected, such as by a user, or can be automatically activated, such as by the sensor 68. With the automatic activation, since a tailgate 12 may be partially opened, in a preferred embodiment, the sensor 68 also determines which light 10, 14 is more viewable based on how far the tailgate 12 is opened. With respect to the manual switch 66, it may be located in a cab of the truck 13, or any other location on the truck 13, likely near the tailgate 12.

While the invention has been described in what is presently considered to be a preferred embodiment, many variations and modifications will become apparent to those skilled in the art. Accordingly, it is intended that the invention not be limited to the specific illustrative embodiment, but be interpreted within the full spirit and scope of the appended claims.

What is claimed is:

1. A third brake light apparatus for a truck, said apparatus comprising:
    a. an attachment comprising a front side, a top side, and a back side wherein said attachment fits over an upper edge of a tailgate;
    b. a reflector cover comprising a top surface connected to at least one of said top side, said front side, and said back side of said attachment;
    c. a light within said reflector cover; and
    d. a wire assembly connected to said light at a first end and comprising a connector at a second end for connecting said cord to a brake light system in said truck; and
    e. wherein said reflector cover further comprises a side reflector surface and said reflector cover is elevated above said tailgate wherein said side reflector surface is visible when illuminated by said light when said tailgate is in a closed position and said top surface is visible when illuminated by said light when said tailgate is in an opened position.

2. The apparatus of claim 1 further comprising a securing device to connect said apparatus to said tailgate.

3. The apparatus of claim 1 wherein said attachment further comprises an inner surface which protects physical characteristics of said tailgate.

4. The apparatus of claim 3 wherein said inner surface comprises a foam inner surface.

5. The apparatus of claim 1 wherein said reflector cover and said light are operable to be selectively positioned on at least one of said upper edge of said tailgate and a side surface of said tailgate.

6. On a vehicle having a tailgate that is operable to be lowered to an open position and raised to a closed position, an improvement comprising a brake light attached to said tailgate wherein said brake light is selectively movably positioned on at least one of an upper edge of said tailgate and a side surface of said tailgate, wherein said brake light comprises a top and side reflection surface and said reflection surfaces are raised above a surface of said tailgate.

7. The improvement of claim 6 further comprising an electrical connector connecting said brake light to a brake light system on said vehicle.

8. The improvement of claim 6 wherein said brake light is selectively positioned based on a position of said tail ate.

9. The improvement of claim 8 wherein said brake light is selectively positioned by a user based on a position of said tailgate.

10. The improvement of claim 8 wherein said brake light is selectively positioned automatically based on a position of said tailgate.

11. A third brake light system for a vehicle, said system comprises:
    a. a first brake light connected to an upper edge of a tailgate of said vehicle;
    b. a second brake light connected to a side surface of said tailgate;
    c. a switch to activate at least one of said first brake light and said second brake light based on a position of said tailgate.

12. The system of claim 11 further comprising a sensor to determine a position of said tailgate.

13. The system of claim 12 wherein said sensor commands said switch to activate at least one of said first brake light and said second brake light based on a position of said tailgate.

14. The system of claim 11 wherein said first brake light and said second brake light are activated simultaneously.

15. A method for providing a third brake light on a vehicle with a tailgate, said method comprising:
    a. providing a tailgate that is operable to be positioned in a closed and an opened position;
    b. providing a brake light attached to said tailgate wherein said brake light is elevated above said tailgate and wherein a side reflector surface and a top reflector surface are visible and
    c. selectively positioning said brake light to illuminate towards traffic behind said vehicle, dependent on a position of said tailgate.

16. The method of claim 15 wherein selectively positioning said brake light further comprises at least one of positioning said brake light on an upper edge of said tailgate when said tailgate is in an opened position and positioning said brake light on a side of said tailgate when said tailgate is in a closed position.

17. The method of claim 15 wherein selectively positioning said brake light further comprises at least one of positioning said brake light on an upper edge of said tailgate when said tailgate is at least one of opened and closed, positioning said brake light on a side of said tailgate when said tailgate is closed.

* * * * *